US012578276B2

(12) United States Patent
Sobron et al.

(10) Patent No.: US 12,578,276 B2
(45) Date of Patent: Mar. 17, 2026

(54) METHOD AND SYSTEM FOR MAPPING ELEMENTAL COMPOSITION IN DYNAMIC AND HETEROGENOUS MATERIAL

(71) Applicant: Impossible Sensing LLC, St. Louis, MO (US)

(72) Inventors: Pablo Sobron, St. Louis, MO (US); Kirby H. Simon, St. Louis, MO (US); Daniel C. Van Hoesen, St. Louis, MO (US); Owen M. Pochettino, St. Louis, MO (US)

(73) Assignee: Impossible Sensing LLC, St. Louis, MO (US)

( * ) Notice: Subject to any disclaimer, the term of this patent is extended or adjusted under 35 U.S.C. 154(b) by 199 days.

(21) Appl. No.: 17/713,224

(22) Filed: Apr. 4, 2022

(65) Prior Publication Data

US 2022/0317048 A1      Oct. 6, 2022

Related U.S. Application Data

(60) Provisional application No. 63/169,924, filed on Apr. 2, 2021.

(51) Int. Cl.
  *G01N 21/71*      (2006.01)
  *G01N 21/39*      (2006.01)
(52) U.S. Cl.
  CPC .......... *G01N 21/718* (2013.01); *G01N 21/39* (2013.01); *G01N 2201/0612* (2013.01); *G01N 2223/401* (2013.01); *G01N 2223/402* (2013.01)
(58) Field of Classification Search
  CPC ................. G01N 21/718; G01N 21/39; G01N 2201/0612; G01N 2223/401; G01N 2223/402
  See application file for complete search history.

(56) References Cited

U.S. PATENT DOCUMENTS

| | | | | |
|---|---|---|---|---|
| 11,085,882 B1 * | 8/2021 | Bol'shakov | ........... | H01J 49/105 |
| 2016/0274025 A1 * | 9/2016 | Skibo | ..................... | G06N 3/006 |

(Continued)

FOREIGN PATENT DOCUMENTS

| | | | | |
|---|---|---|---|---|
| CN | 206161532 U | * | 5/2017 | |
| WO | WO-2015200111 A1 | * | 12/2015 | ........... B07C 5/3425 |
| WO | WO-2019213765 A1 | * | 11/2019 | ............ G01J 3/0208 |

OTHER PUBLICATIONS

Ilkka "Scanning laser-induced breakdown spectrometer for mine walls", Thesis of Master of Science in Technology, Aalto University , school of Electrical Engineering, 2019, p. 1-74. (Year: 2019).*

(Continued)

*Primary Examiner* — David J Makiya
*Assistant Examiner* — Mamadou Faye
(74) *Attorney, Agent, or Firm* — Goodwin Procter LLP

(57)      ABSTRACT

Provided herein is a system and method for elemental abundance monitoring used in ore exploration, mining and processing comprising an optical assembly of sensing elements combined with computer vision techniques for 3-dimensional mapping and optical focusing to identify and map elemental concentrations. Elements are identified using a custom Laser Induced Breakdown Spectroscopy (LIBS) technique where a traditional detector is replaced by a series of photodiodes tuned for specific wavelengths, indicative of the desired element(s). The optical system may be combined with a computer vision architecture to focus the optics by determining the 3-dimensional profile of the material to preserve sensor-sample optical path and geometry, a requirement for quantitative measurements of elemental abundances. The system may be employed in a dynamic system (such as a conveyor belt) where material is analyzed in real-time as it passes a scanner. Alternatively, the system can be used in a static condition without sample movement.

15 Claims, 1 Drawing Sheet

(56)    References Cited

U.S. PATENT DOCUMENTS

| 2017/0059544 A1* | 3/2017 | Stafford | C10G 1/045 |
| 2019/0056374 A1* | 2/2019 | Rocher | G01N 23/207 |
| 2019/0120807 A1* | 4/2019 | Warner | G01N 33/182 |
| 2022/0206024 A1* | 6/2022 | El Mendili | G01N 35/00871 |
| 2023/0013375 A1* | 1/2023 | Sandkuijl | G02B 21/34 |

OTHER PUBLICATIONS

Limbeck et al. "Methodology and applications of elemental mapping by laser induced breakdown spectroscopy", Analytica Chimica Acta 1147, Elsevier, Dec. 30, 2020, p. 72-98 and further in view EL Mendili (US 2022/0206024 A1; pub. Dec. 30, 2020. (Year: 2020).*
Translation of CN 206161532 U (Year: 2017).*

\* cited by examiner

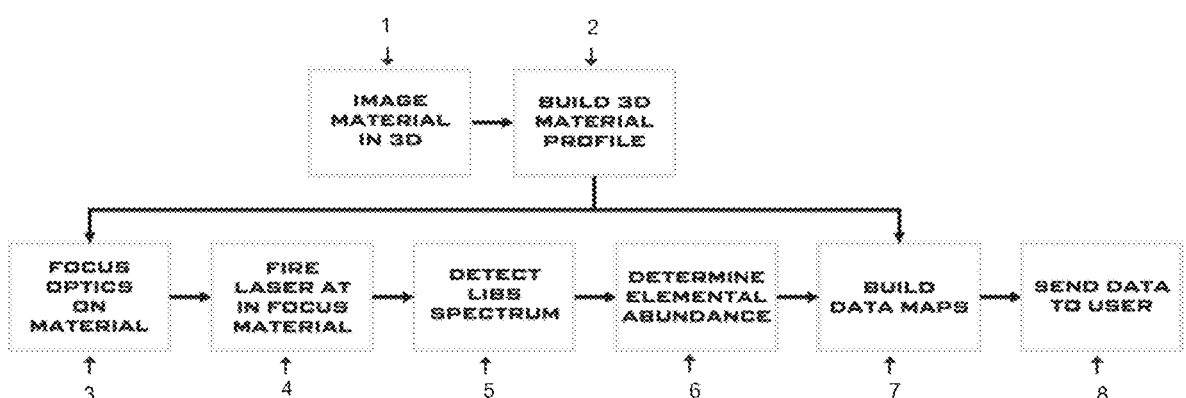

METHOD AND SYSTEM FOR MAPPING ELEMENTAL COMPOSITION IN DYNAMIC AND HETEROGENOUS MATERIAL

RELATED PATENT APPLICATIONS AND INCORPORATION BY REFERENCE

This application claims priority to U.S. Provisional Patent Application Ser. No. 63/169,924, filed on Apr. 2, 2021, the disclosure of which is hereby incorporated by reference in its entirety.

STATEMENT REGARDING FEDERALLY SPONSORED RESEARCH OR DEVELOPMENT

The present invention was made with no governmental support.

FIELD OF THE INVENTION

The present invention relates to a system and method for mapping the elemental composition of dynamic and heterogeneous materials in ore processing, mining and other material processing applications.

BACKGROUND OF THE INVENTION

Prior art systems for characterizing the composition of mining material in real-time have a number of limitations and drawbacks. For example, known systems and methods require extensive and expensive chemical analysis offsite and employ procedures that slow production. One prior art system of note requires diverting material through an external sensing system, which consequently slows production, and further employs instrumentation, including a large CMOS detector, that captures an overabundance of data that is unnecessary for targeting a few select elements. Additionally, instruments known in the art hinder real-time elemental abundance mapping because of low resolution, low sensitivity, and high processing times.

Prior instruments also typically use detectors that capture an overabundance of light frequencies while lacking statistics high enough to accurately determine elemental abundances. When the goal is to quantify the abundance of a few select elements, the prior art fails to capture the correct data. Prior systems also lack high statistics because there is no auto-focusing mechanism maximizing the sensitivity to the elements. As such, prior instruments may not be sensitive enough to accurately detect the concentrations of moving material, such as material transported by a conveyor belt.

In other prior systems, computer vision for focusing and laser-based sensing is used to sort scrap particles by isolating characteristic wavelengths. However, this type of system is limited in that it is designed only for small homogenous pieces, on the order of centimeters to millimeters. Such a system is particularly unsuitable for mining applications, where material is neither homogenous nor particulate, and instead drastically varies in composition and size.

There is a need for a system and method to overcome the aforementioned disadvantages of the prior art. In particular, there is a need for an instrument capable of quickly distinguishing elements on a large amount of material. There is a further need for the same instrument to be capable of performing classification, that is, categorizing and sorting material into a designated class. There also is a need for a system to identify the composition of material on a conveyor belt system to understand the quantity of certain materials rather than to identify specific particles that belong to a group.

SUMMARY OF THE INVENTION

In view of the above, it is an object of the present invention to provide a system and method for high-frequency, high-density and low-cost elemental identification.

In accordance with the present invention, there is provided an optical assembly of sensing elements combined with computer vision techniques for 3-dimensional mapping and optical focusing to identify and map elemental concentrations. The optical system and data processing technique of the present invention allow for real-time elemental abundance monitoring in multiple stages of ore exploration, mining, and processing, including but not limited to: surface exploration survey using handheld devices or platform-mounted devices (e.g. rovers and manned and unmanned autonomous systems); subsurface exploration using downhole wireline logging systems and core scanning and logging instruments; ore preprocessing at blast site; ore transport in hauling trucks and conveyor belts; ore processing in separators and sorting platforms; and quality control/quality assurance of final product by both producer and end user.

Elements are identified using a custom Laser Induced Breakdown Spectroscopy (LIBS) technique where a traditional detector is replaced by a series of photodiodes tuned for specific wavelengths, indicative of the desired element(s). In LIBS, elements in a material are excited by a scanning laser. The elements then emit light to return to a lower energy state. The emitted light is detected using the photodiodes. The optical system is combined with a computer vision architecture to focus the optics by determining the 3-dimensional profile of the material to preserve sensor-sample optical path and geometry, a requirement for quantitative measurements of elemental abundances.

In one embodiment, the instrument can be attached to a dynamic system (such as a conveyor belt) where material is analyzed in real-time as it passes a scanner.

In yet another embodiment, the instrument can be used in a static condition without sample movement.

BRIEF DESCRIPTION OF THE DRAWINGS

FIG. 1 is a flowchart of a data processing technique of the present invention.

DETAILED DESCRIPTION

The following detailed description is merely exemplary in nature and is not intended to and should not be interpreted to limit the embodiments described herein. Although particular embodiments are described, those embodiments are merely exemplary implementations of the present invention. The following descriptions herein should be considered illustrative in nature, and thus, not in any way limiting the scope of the present invention. One skilled in the art will recognize other embodiments are possible and all such embodiments are intended to fall within the scope of the present disclosure. The intent is to include all alternatives, modifications, and equivalents that embody the spirit and scope of the disclosure.

It is also to be understood that the disclosure uses terminology for the purpose of describing particular embodiments and such terminology is not intended to be limiting.

Unless defined otherwise, all technical and scientific terms used in this disclosure have the same meaning as commonly understood by one of ordinary skill in the art to which is applicable to this disclosure.

As will be apparent to those of skill in the art upon reading this disclosure, each of the embodiments described herein has discrete components and features which may be readily separated or combined with features of any of the other possible embodiments without departing from the spirit and scope of the present disclosure.

The following definitions apply to the terms listed below and are provided to aid in understanding the present invention, as described herein:

"Sensor"—used when referring to the photodiodes.

"Optical System"—used when referring to the sensor and laser in combination.

"Instrument"—used when referring to the optical system and the computer vision system in combination.

In a preferred embodiment, a system for elemental identification uses a series of photodiodes tuned for specific wavelengths indicative of specific elements expected to be found in the material under investigation. Preferably using a plurality of photodiodes tuned for specific wavelengths, concentrations of desired elements can be determined with a high degree of accuracy. The instrument is, thus, designed to characterize several desired elements. Bandpass filters placed in front of the photodiodes provide wavelength discrimination required for compositional determination. Any bandpass filter known by those skilled in the art to be suitable for this particular need are advantageously employed in the system of the present invention. For example, in mining applications, the bandpass filters may be chosen to provide iron and sulfur LIBS peaks. According to the present invention, fine tuning the instrument for a specific application allows for real-time data processing and accurate compositional analysis for the desired element. Using a single photodiode for a specific wavelength allows for much greater sensitivity to that wavelength than traditional LIBS instruments while reducing data complexity and size. The reduction in data volume allows for the instrument to process data with high frequency and density. The detectors employed by the preferred embodiment offer an advantage over traditional detectors that are a high-cost item in most elemental mapping techniques. Using the photodiode detectors of the present invention also significantly reduces the cost from traditional LIBS instruments, thereby eliminating a barrier to elemental analysis in real-time.

According to the present invention, machine learning algorithms known to those of ordinary skill in the art, including regression models, neural networks, and decision trees, are trained on material of known concentration. These algorithms are then given the data from the detectors in real-time to determine the elemental abundances. The goal of the machine learning algorithms is not to classify the material into a category but to give a quantitative number indicating the amount of material characterized as a specific element, distinguishing the new work from prior work.

Computer vision algorithms are used to identify the profile of the material transported by a conveyor belt so that the optical system can automatically focus on the material as it passes the instrument. The instrument can operate in multiple configurations with the mapping occurring from above the material using imaging from multiple cameras (stereo imaging) and image analysis to create 3-dimensional information or using light detection and ranging (LiDAR) to automatically create 3-dimensional point cloud information. The 3-dimensional information categorizing the material profile is passed to the computer controlling the optical system to inform the focusing of the laser and detector. In focus measurements allow for high resolution chemical analysis. Material volume is also calculated from the point cloud information. In one architecture, material elemental and volume maps are provided in real-time, informing material processing procedures and operational efficiencies.

According to the present invention, the architecture of the system allows for contactless measurements of moving material and does not alter or disrupt current material processing. In another embodiment, material moving along a conveyor belt is scanned without the need for material diversion into a sensing instrument. Results are transferred to a central control system where they provide input for downstream processing.

FIG. 1 illustrates a preferred method in accordance with the present invention. In an embodiment employable in conveyor belt operations, material is excavated and placed on a conveyor belt system to be analyzed and then processed. As the material passes the elemental analysis instrument, 3-dimensional imaging occurs 1. Data, such as images or point cloud information, is analyzed immediately and the material profile is sent to a computer controlling the measurement optics 2. With the belt speed known and the material profile known, the optical system for the elemental measurements focuses on the material 3, fires a laser 4, and collects characterizing information using photodiodes tuned to specific wavelengths 5. The measurement occurs along the current line of material passing the instrument 6. As the conveyor belt of material continually progresses and the measurements continue, the data from the photodiodes is analyzed using machine learning algorithms and given to the user as a stream of data equivalent in speed to the material transported by the conveyor belt 7. The user sees a map of elemental abundances and material volume in real-time 8.

Having described the preferred embodiment of the present invention, any number of changes, variations and improvements which may be apparent to those skilled in the art are within the scope of the invention claimed and described herein.

What is claimed is:

1. A system for elemental abundance detection comprising:

a plurality of photodiodes each tuned for a specific wavelength indicative of a desired element in a non-particulate material under investigation;

a scanning laser that excites the elements and causes light to be emitted from the elements; and a plurality of bandpass filters placed in front of the photodiodes that provide wavelength discrimination of each specific wavelength for compositional determination of a plurality of elements in the non-particulate material including providing laser induced breakdown spectroscopy (LIBS) peaks of heterogeneous elements of the non-particulate material that vary in composition and size in ore processing.

2. A system for simultaneously measuring material volume and elemental composition comprising:

a first imaging system configured to create three-dimensional reconstructions of a material when the material is transported and moves through the first imaging system and range to produce point cloud data in real time, wherein the point cloud data both informs optical focuses of lasers and detectors and provides three-dimensional information to a user; and a second imaging system configured to automatically focus on and scan the dynamic material that is moved through the second imaging system, detect light at specific wavelengths to characterize and map desired elements of the material, and compute a quantity of each desired element in the material using a machine learning algorithm for providing to the user at a speed at which the material is moved through the second imaging system, wherein each desired element is characterized by the light at one of the specific wavelengths.

3. A method for processing three-dimensional (3-d) point cloud information and elemental composition data to create 3-d reconstructions of material and elemental abundance maps comprising:

receiving images and point cloud data of a material from photodiode detectors;

converting the images and point cloud data to material volumes; and converting light intensity at specific wavelengths to volume maps of each element of the material in real time using a machine learning model trained on material with known element concentrations including determining a quantitative number indicating the amount of material characterized as each specific element.

4. A method of measuring material volume and elemental composition comprising:

imaging a material in three dimensions, wherein the material is excavated and placed on a conveyor belt system;

automatically determining, using imaging data of the material and speed data of a conveyor belt, focus measurements that control an optical system to focus on the material when the material is moving on the conveyor belt;

collecting measurements and determining elemental abundance in the material based on focusing the optics on the material when the conveyor belt continually progresses;

building data maps of elemental abundance and material volume in real time; and transmitting the data maps to a user.

5. The system of claim 1, wherein the plurality of photodiodes are tuned for specific wavelengths indicative of specific elements expected to be found in the material such that concentrations of the desired elements can be accurately determined.

6. The system of claim 1, wherein the plurality of band-pass filters configured to provide iron and sulfur LIBS peaks.

7. The system of claim 1, wherein the plurality of photodiodes are further fine-tuned for a specific application, wherein the fine tuning comprises using a single photodiode for a specific wavelength to increase sensitivity of detecting a specific element while reducing data complexity and size.

8. The system of claim 2, wherein the first imaging system is configured to create the three-dimensional reconstructions using imaging from stereo light detection.

9. The system of claim 2, wherein the first imaging system comprises light detection and ranging (LiDAR) to automatically produce the point cloud data.

10. The method of claim 3, further comprising calculating the material volume from the point cloud data.

11. The method of claim 3, further comprising providing material elemental and volume maps in real-time.

12. The method of claim 4, further comprising:

building a three-dimensional material profile, wherein focusing the optics is based on the material profile and the speed of the conveyor belt.

13. The method of claim 4, wherein, to collect the measurements and determining the elemental abundance, the method further comprises:

firing a laser at the material; and detecting a laser induced breakdown spectroscopy.

14. The method of claim 4, wherein the data maps are transmitted to the user as a stream of data in the speed of the conveyor belt.

15. The method of claim 1, wherein the non-particulate material is larger in size than a particulate material that is on the order of centimeters to millimeters.

\* \* \* \* \*